United States Patent Office 3,033,685
Patented May 8, 1962

3,033,685
MALT-CONTAINING SILAGE AND METHOD
OF MAKING THE SAME
Clifford Maurice Hollenbeck, Manitowoc, and Jack Marshall Sheneman, Manitowoc County, Wis., assignors to Wisconsin Malting Co., Milwaukee, Wis., a corporation of Wisconsin
No Drawing. Filed Jan. 29, 1960, Ser. No. 5,339
18 Claims. (Cl. 99—9)

This invention relates to animal feedstuffs. More particularly, this invention is concerned with improved silage, processes of producing the same and novel premixes useful in preparing the improved silage.

The production of silage from plant roughage such as grasses, legumes and other forage crops including bluegrass, orchardgrass, alfalfa, clover, corn, sorghum, oats and fescue is an ever increasingly popular method of harvesting, storing and preserving such valuable feedstuffs. This is because there are distinct advantages in making silage from forage crops, i.e. plant roughage, over curing them as hay. Some of these advantages are the relative independence of the silage making process on weather, the superior feeding value of silage over ordinary hay, the greater palatability of silage, the ease of feeding silage with little or no waste and the decreased storage space necessary for the more compact silage.

The silage making process comprises essentially chopping and packing green forage into a storage container, usually a cylindrical silo or pit in the ground, and allowing fermentation to take place with production of lactic acid. When the chopped green forage is tightly packed in the silo, the microorganisms utilize the nutrients from expressed juices and ferment them into acidic substances. The types of microorganisms present in the packed material, the supply of fermentable nutrients, the level of entrapped air in the forage, and the type and rate of fermentation determine to a large extent the quality of the silage produced. For good silage it is important that the fermentation produce mainly lactic acid and that this fermentation take place rapidly.

Since the production of lactic acid during silage fermentation is an important step in the production of good silage, it is necessary that the forage mixtures are infected with the lactic acid producing organisms at the time they are packed in the silo. In addition to the need for an abundance of the proper organisms, there is a critical need in the silage mixture for readily fermentable sugar material for the lactic organisms to ferment into lactic acid. Furthermore, it is important that the organisms are readily adaptable to the conditions in the storage container, especially to ferment rapidly those sugars that are present. Quite often, however, in the production of silage from grasses, legumes, or green corn the silage spoils, or becomes of inferior quality, due to one or more of the following causes: (1) insufficient numbers of the right microorganisms, (2) insufficient fermentable material, and/or (3) the lack of rapid adaptation of the organisms to the fermentable materials.

Usually when the silage fermentation does not produce lactic acid rapidly enough, the pH of the ensiled forage material does not drop below about 5.0 within the first few days after packing. When this occurs the putrefactive organisms, such as the anaerobic, spore-forming organisms, multiply rapidly and ferment the readily available nutrients to butyric and other acids. The optimum pH for these anaerobic organisms is above 5.0, according to Bergey's Manual, 7th Edition. Some of these organisms produce butyric acid in silage causing a spoiled, offensive odor, and feeding of this type of silage is associated with the disease in cattle known as ketosis (Adler et al.—American Journal of Vet. Res.) 19, 314—18 (1958). Furthermore, anaerobic organisms often produce nitric oxide and methane from forage materials and these toxic gases are often deleterious to the humans handling silage.

In order to insure proper and rapid fermentation, it is a common practice to add to ensiled forage material various carbohydrate materials such as cereal grains, molasses, potatoes, etc. Furthermore, it is sometimes the practice to insure a low pH with its inhibitory effect on spoilage organisms by adding acids to the forage material during packing. The addition of sulfur dioxide and formaldehyde as bacterio-static agents against the spoilage organisms has also been tried. The use of these additives does not always insure good silage fermentation, however, since they do not always provide all of the conditions for good fermentation; namely, a large population of lactic acid producing organisms, a readily available carbohydrate source, essential nutrients for growth and fermentation, and ready adaptation between organisms and fermentables.

It is an object of this invention to provide a process for making silage from plant roughage and forage crops such as grasses, legumes, and/or corn which insures rapid and proper production of lactic acid within the first few days following packing of the fresh material so that the pH of the ensiled material falls rapidly well below 5.0 and growth of the spoilage organisms is inhibited. It is a further object of this invention to produce high quality silage from green forage materials by incorporating a small amount of barley malt or malt by-products into the chopped forage material during packing into the container, i.e., silo.

According to the present invention it has been discovered that the inclusion of a small amount of barley malt or a solid organic malt by-product, such as malt rootlets or husks, into plant roughage or chopped green forage at the time it is filled into a silage container enhances the production of good quality silage. This is usually accomplished by the rapid production of lactic acid and a quick drop of the silage pH to below pH 5.0 which encourages growth of lactic acid producing microorganisms while simultaneously suppressing growth of undesirable microorganisms. Spoilage is thus decreased or eliminated while the quality of the silage is enhanced.

Inclusion of the malt or malt by-product in green forage can be effected by adding the malt, or malt by-product, advisably finely ground, at a constant rate with uniform distribution simultaneously with the loading of the forage into the silage container, be it pit or silo. Malt and its solid by-products can be conveniently added to the forage mixture just prior to the chopped forage being blown into the silo. However, it can also be thrown in periodically by hand as the loading progresses, either while the field carts are being loaded or after the forage is in the silo, with care being taken to achieve uniform distribution.

Although the malt as such can be added to the forage material directly, it is sometimes desirable to first prepare a premix of the malt or malt by-product with a diluent or distributing agent which can then be added to the forage being loaded into the silage container. This diluent can be chopped forage itself, either green or dried. Other such distributing agents which might be used are ground corn cobs, cracked or ground grains, dried sugar beet pulp, soybean meal, dried molasses or the like. The malt or malt by-product content of such premixes can be any amount desired but would generally be from about 10% to 75% by weight.

The amount of malt or malt by-product to be included in the green forage to facilitate silage production, raise quality and guard against spoilage is small and not narrowly critical. More particularly, from 0.25 to 8% by weight of malt, or a malt by-product, based on the weight of green forage material can be used to achieve such benefits. Testing has shown, however, that more than 2% by weight, based on the green forage, of malt itself is not generally needed since larger amount do not usually give better results than those achieved with less. Although amounts less than 0.25% are effective, for practical reasons it is desirable to use at least 0.25%, and advisably 0.50%, by weight of malt itself. Malt by-products, since they do not contain amounts of lactic acid organisms, enzymes, carbohydrates and othe nutrients equal to malt itself, are added in larger amounts by weight to the green forage material. Thus, about 1 to 5% by weight of malt rootlets and about 2 to 8% by weight of malt husks are advisably included in the green forage to obtain the greatest benefits of this invention.

The composition considered most suitable generally for practicing this invention is a mixture of malt, malt rootlets and malt husks. Such a mixture can contain from 5 to 75% by weight of malt, 5 to 75% by weight of malt rootlets and 5 to 75% by weight of malt husks. Such a mixture can be added at a concentration of about 5 to 180 pounds per ton of green forage to give a suitable concentration therein; however, 20 pounds of such a mixture per ton of silage usually is sufficient for the intended purpose.

After the green forage-malt mixture has been placed in the silage container it can be handled in the usual way before, during and after the silage fermentive process. The green forage-malt mixture is considered "silage" as this term is used herein after it has fermented for at least five days.

The lactic acid fermentation acceleration in silage by malt or malt by-products is considered to be due to the malt additive which adds an inoculum of lactic acid producing microorganisms, a readily fermentable carbohydrate, sufficient soluble nitrogen supplying material, vitamins and minerals necessary for, or conducive to, rapid initial lactic acid production in the fermentation. Experience has shown that malt and malt by-products normally carry huge numbers of active lactic acid producing microorganisms per gram. Furthermore, malt supplies an enzyme system for continued production of fermentable products. Since lactic acid producing organisms multiply prolifically on germinated barley during the malting process and survive the malt drying process, these organisms are well adapted to the malt and thus ferment the malt carbohydrates at an exceedingly rapid rate.

Malt contains glucose and maltose which are readily fermentable and, in addition, it contains strong carbohydrate-splitting enzymes, such as the amylases and hemicellulases, which convert the starches and cell wall material of either the malt itself or the grass or legume into readily fermentable sugars. Furthermore, during the malting process about 30 to 50% of the proteinaceous material in the malt becomes water soluble. This soluble protein material represents readily available nitrogen for rapid cell growth necessary for rapid fermentation. In this respect, malt is unique compared to ordinary cereal grains and the other carbohydrate materials in the usual silage additives.

Conversely, it can be assumed that the addition of most any carbohydrate material, such as molasses or cereal grains, to silage may furnish carbohydrate material for fermentation, but the lactic acid producing microorganisms present in green forage may not be readily adaptive to the fermentable material. In such a case a lag in growth and fermentation would occur while the organisms become adaptive. This lag would allow the putrefying organisms (spoilage organisms) to multiply and utilize the available nutrients. A general laboratory procedure for evaluating silage additives was developed. Using this procedure experiments were performed showing the value of malt and malt by-products as silage additives. The laboratory procedure is as follows:

A mixture of chopped green grasses and legumes was brought to a uniform moisture content of 68 to 70% by the addition of water. After the water was thoroughly mixed into the chopped forage material, the forage was divided into a number of portions. The various additives, or concentration of additives, to be evaluated were mixed into the portions of forage material and the resulting portions were packed tightly into pint fruit jars. The jars were closed tightly, sealed with ordinary fruit jar lids, and allowed to incubate at room temperature. At intervals, a jar representing each variable was opened and evaluated by determining the pH of the ensiled material, and by examining it for spoilage using odor and color as criteria.

Example I

Samples of a mixture of grasses and legumes were ensiled by the laboratory procedure, with and without 2% ground malt by weight of the green material. The results of two separate experiments are shown in the following tables. The index of silage quality in these experiments is the rate of drop in pH, i.e., the faster the drop in pH the better the silage quality. It is readily noted that the forage containing the ground malt rapidly and continually developed acid materials. The pH dropped to below 4.5 in 5 days with very little fluctuation, up and down, on continued fermentation. The odor of the malt treated samples was pleasant, while the odor of the controls became putrid and spoiled.

| Days of fermentation | pH | |
|---|---|---|
| | Control | 2% malt |
| 0 | 6.20 | 6.20 |
| 5 | 5.05 | 4.45 |
| 7 | 4.80 | 4.35 |
| 13 | 4.90 | 4.45 |
| 26 | 5.20 | 4.30 |
| 28 | 4.90 | 4.25 |
| 36 | 5.15 | 4.30 |

| Days of fermentation | pH | |
|---|---|---|
| | Control | 2% malt |
| 0 | 6.40 | 6.40 |
| 2 | 4.85 | 4.95 |
| 5 | 5.25 | 4.35 |
| 10 | 5.00 | 4.20 |
| 26 | 5.30 | 4.45 |

Example II

Chopped alfalfa was ensiled with, and without, various carbohydrate additives by the general laboratory procedure. The grain additives were finely ground before adding. The molasses was added as dried solids. The data in the following table shows that malt is superior to other carbohydrate materials as a silage additive.

| Days of fermentation | pH | | | | |
|---|---|---|---|---|---|
| | Control | 2% barley | 2% molasses | 2% corn meal | 2% malt |
| 0 | 6.40 | 6.40 | 6.40 | 6.40 | 6.40 |
| 2 | 6.60 | | | 6.45 | |
| 3 | | 5.85 | 5.50 | | 5.40 |
| 4 | 5.75 | 5.70 | 5.55 | 5.60 | 5.30 |
| 6 | 5.65 | 5.40 | 5.15 | 5.45 | 5.05 |
| 8 | 5.70 | 5.20 | 5.10 | 5.15 | 4.95 |
| 12 | 5.65 | 5.15 | 5.15 | 5.25 | 4.85 |

Using pH 5.0 as the critical point, the malt samples reached this pH in seven days, while none of the other samples reached pH 5.0 even after 12 days. The odors of the samples were also indicative of quality, since all of the 12 day samples were spoiled to various degrees, except the sample containing malt.

It has been noted that the pH of ensiled materials sometimes rises, instead of lowering. This observation has been made many times in control silage. It is believed that this rise in pH is due to putrefying organisms degrading the proteins in the forage and liberating ammonia or other basic materials.

Example III

The data in the following table illustrates the fermentation accelerating effect of various levels of malt on grass-legume silage prepared by the laboratory procedure.

| Days of fermentation | pH | | | |
|---|---|---|---|---|
| | Control | 0.5% malt | 1% malt | 2% malt |
| 0 | 6.40 | 6.40 | 6.40 | 6.40 |
| 2 | 4.85 | 4.85 | 4.90 | 4.95 |
| 5 | 5.25 | 4.60 | 4.70 | 4.35 |
| 10 | 5.00 | 4.35 | 4.25 | 4.20 |
| 14 | 4.80 | 4.60 | 4.40 | 4.50 |
| 26 | 5.30 | 4.55 | 4.40 | 4.45 |

Based on the results from this experiment 0.5% by weight of ground malt is as effective as 2% ground malt. This would indicate that the malt exerts a catalytic effect, somewhat independent of quantity, which "triggers" the fermentation.

Example IV

The data in the following tables show the effectiveness of the malt by-products, rootlets and husks, as silage additives.

| Days of fermentation | pH | | |
|---|---|---|---|
| | Control | 4% rootlets | 4% husks |
| 0 | 6.40 | 6.40 | 6.40 |
| 3 | 5.20 | 4.50 | 4.95 |
| 5 | 5.85 | 4.75 | 4.90 |
| 7 | 5.20 | 4.65 | 4.90 |
| 10 | 5.05 | 4.85 | 4.65 |
| 19 | 4.85 | 4.45 | 4.70 |

| Days of fermentation | pH | |
|---|---|---|
| | Control | 2% rootlets |
| 0 | 6.40 | 6.40 |
| 2 | 4.85 | 5.60 |
| 5 | 5.25 | 4.55 |
| 10 | 5.00 | 4.35 |
| 14 | 4.80 | 4.35 |
| 26 | 5.30 | 4.45 |

These data demonstrate that the malt by-products are effective fermentation accelerators in silage. The malt husks, however, are not as effective as the rootlets.

Example V

Green corn silage was prepared by the laboratory procedure, with and without 2% ground malt. The results of this experiment are shown in the following table.

| Days of fermentation | pH | |
|---|---|---|
| | Control | 2% malt |
| 0 | 5.50 | 5.50 |
| 3 | 4.00 | 3.90 |
| 6 | 3.85 | 3.65 |
| 26 | 3.85 | 3.65 |

The data in this experiment show that malt accelerates the fermentation in green corn silage. The control silage, however, ferments at a rapid rate (compared with grass or legume silage) and there is relatively less effect shown by the malt.

Example VI

A mixture of grasses and legumes was chopped and packed into pilot scale silos made from clay tile cylinders eight inches in diameter and thirty-six inches long. The tile cylinders were capped on the bottom with circular clay plates, and sealed at the top by polyethylene covers with weights on top.

The data in the following table illustrates the effectiveness of adding ground malt to the ensiled mixture in these silos.

| Type of silage | pH of silage after 6 weeks |
|---|---|
| Control | 5.0 |
| Silage with 2% ground malt | 4.3 |

Various changes and modifications of the invention can be made and, to the extent that such variations incorporate the spirit of this invention, they are intended to be included within the scope of the appended claims.

What is claimed is:

1. The method of making silage which comprises including dry malt in green forage and storing it in a silage container under silage producing conditions.

2. The method of making silage which comprises including about 0.25 to 8.0% by weight of dry ground malt in green forage and storing it in a silage container under silage producing conditions.

3. The method of making silage which comprises including dry malt rootlets in green forage and storing it in a silage container under silage producing conditions.

4. The method of making silage which comprises including about 0.25 to 8.0% by weight of dry ground malt rootlets in green forage and storing it in a silage container under silage producing conditions.

5. The method of making silage which comprises including dry malt husks in green forage and storing it in a silage container under silage producing conditions.

6. The method of making silage which comprises including about 0.25% to 8.0% by weight of dry ground malt husks in green forage and storing it in a silage container under silage producing conditions.

7. The method of making silage which comprises including a mixture of dry malt, dry malt rootlets, and dry malt husks in green forage and storing it in a silage container under silage producing conditions.

8. The method of making silage which comprises including a mixture of 5 to 75% dry ground malt, 5 to 75% dry ground malt rootlets and 5 to 75% dry ground malt husks in green forage and storing it in a silage container under silage producing conditions.

9. Silage from green forage containing 0.25 to 8% of a member of the group consisting of added dry malt, dry malt rootlets and dry malt husks.

10. Silage containing 0.25 to 2.0% based on the weight of the green forage of added dry ground malt.

11. Silage containing 2.0 to 4.0% based on the weight of the green forage of added dry malt rootlets.

12. Silage containing about 2.0 to 8.0% based on the weight of the green forage of added dry malt husks.

13. Chopped green forage containing added dry malt fermented in a silage container for at least five days.

14. Chopped green forage containing added dry malt rootlets fermented in a silage container for at least five days.

15. Chopped green forage containing added dry malt husks fermented in a silage container for at least five days.

16. The method of making silage consisting essentially of adding a member of the group consisting of dry malt, dry malt rootlets and dry malt husks to green forage and storing it in a silage container under silage producing conditions.

17. The method of claim 16 in which 0.25% to 8.0% by weight, based upon the green forage, of the said malt products are included in the green forage.

18. The method of claim 16 in which the said malt products are added in ground form.

References Cited in the file of this patent
UNITED STATES PATENTS

| | | |
|---|---|---|
| 1,807,043 | Mabee | May 26, 1931 |
| 1,807,067 | Mabee | May 26, 1931 |
| 2,299,745 | Hansen | Oct. 27, 1942 |